United States Patent [19]
Olson

[11] 3,758,992
[45] Sept. 18, 1973

[54] SEALED CLOSURES WITH WEATHER-STRIPPING

[75] Inventor: Harold G. Olson, Westport, Conn.

[73] Assignee: H. G. Olson & Co., Inc., Amesbury, Mass.

[22] Filed: Oct. 4, 1971

[21] Appl. No.: 186,237

Related U.S. Application Data

[63] Continuation-in-part of Ser. No. 44,977, June 10, 1970.

[52] U.S. Cl.................. 49/489, 161/64, 161/161, 264/321
[51] Int. Cl............................................. E06b 7/23
[58] Field of Search.................. 49/489, 488, 485, 49/475; 264/157, 160, 163, 146, 321; 161/67, 64, 62, 161

[56] References Cited
UNITED STATES PATENTS

| | | | |
|---|---|---|---|
| 3,396,712 | 8/1968 | Sakraida et al. | 49/489 X |
| 3,170,967 | 2/1965 | Williams et al. | 49/489 X |
| 2,327,580 | 8/1943 | Carney | 49/489 |
| 2,655,698 | 10/1953 | Chalik et al. | 49/489 |
| 2,744,847 | 5/1956 | Orr | 49/489 X |
| 3,123,656 | 3/1964 | Rochlin | 264/146 X |
| 3,166,332 | 1/1965 | Olson | 49/489 X |
| 3,261,133 | 7/1966 | Herr et al. | 49/489 X |
| 3,266,190 | 8/1966 | Jackson | 49/489 |
| 3,404,487 | 10/1968 | Johnson | 49/489 X |
| 3,456,410 | 7/1969 | Olson et al. | 49/489 X |

Primary Examiner—Mervin Stein
Assistant Examiner—Philip C. Kannan
Attorney—Howard M. Bollinger et al.

[57] ABSTRACT

Weather-stripping especially for slidable closures such as windows, wherein the weather-stripping comprises a flexible plastic foam substrate provided on at least a part of its outer surface with a tough abrasion resistant skin. The weather-stripping is compressed into a confining channel in one closure member, and is provided with flocked fibers extending away therefrom to engage a second closure member to prevent the infiltration of air and water. The substrate may preferably comprise ionomer plastic foam. The outer skin may be of the same material as is the cellular substrate or it may be a different material, e.g. laminated to at least one side of the cellular substrate to provide a smooth yet abrasion resistant surface. Specific cross-sectional shapes of weather-stripping are disclosed, together with manufacturing methods wherein the weather-stripping is shaped while in sheet form and then is slit into strips for insertion into the channel member.

6 Claims, 13 Drawing Figures

INVENTOR
Harold G. Olson
BY
Bryan, Parmelee, Johnson & Bollinger
ATTORNEYS.

INVENTOR
Harold G. Olson

SEALED CLOSURES WITH WEATHER-STRIPPING

This application is a continuation-in-part of my co-pending application Ser. No. 044,977, filed on June 10, 1970.

This invention relates to sealing elements for sealed closures such as storm windows. More particularly, this invention relates to improved weather-stripping arrangements.

Various weather-stripping techniques are in use at the present time. Commonly, the closure is formed with a retaining channel (see, for example, U.S. Pat. No. 2,784,813) in which is placed a weather-strip in the form of a backing member comprising a relatively thin flat strip of fabric, or cloth-like material, having secured thereto a woven or flocked pile of fibers. To establish full sealing contact between the ends of woven fibers and the adjacent member of the closure to be sealed, the fibers typically must be relatively long, thus requiring very high density of pile ends in order to get maximum cushioning resilience, and air and water resistance. In fact the maximum densities which can be woven have not proven adequate from the standpoint of air and water resistance, and it has been necessary to use ancillary fins or barriers such as shown in U.S. Pat. Nos. 3,175,256 (Horton) and 3,175,257 (Kessler). Where the weather-strips use flocked pile, it generally is not practical to provide flocking of a length greater than about 0.170 inch, whereas total heights greater than 0.5 inch may be required. Flocked fibers also are limited in density, so that, when depended upon for resilience and resistance to air and water infiltration, they give poor results.

Weather-stripping in accordance with the present invention avoids such problems with prior art constructions, and can be used with a wide variety of closures, both metal and wood, including panels, storm windows and doors, prime windows and doors, etc., to seal out the weather and prevent rattles. This novel weather-strip construction is resiliently compressible and capable of being compressed repeatedly while retaining its ability quickly to regain its original configuration upon release of the compressive force. When compressed between two adjacent surfaces, the weather-stripping will snugly fill the air gap between the two surfaces without significant voids, thereby forming an excellent seal and preventing the infiltration of air and water.

Weather-stripping in accordance with the present invention advantageously possesses a low coefficient of friction so that it will not adversely affect the operation or movement of slidable door or window members. The low coefficient of friction also allows the weather-stripping to be readily inserted into a retaining channel.

In accordance with another aspect of the invention, weather-stripping is provided having good dimensional stability and resistance to shrinking due to temperature changes. Such shrinking of weather-stripping in prior art constructions permitted air and water to infiltrate through an air gap.

Weather-stripping of the present invention is economical to manufacture, particularly because in certain forms it can be mass produced from sheets of relatively inexpensive cellular plastic material with minimum individual forming or machining required.

In a preferred embodiment of the present invention, the closure is made with a confining channel into which is inserted a compressed segment of a relatively thick foamed plastic substrate a portion of which advantageously bulges or otherwise extends out through the channel opening towards the adjacent member of the closure. This bulging portion is covered with flocked fibers which are relatively short, but which, because of the thickness (i.e. height) of that portion of the substrate, make intimate and tight sealing engagement with the adjacent closure member to be sealed. In certain forms of the invention, the plastic material used to construct the weather-stripping may be either thermoplastic or thermosetting; however, best results in many typical applications may be obtained by making the weather-stripping from foamed ionomer thermoplastic. The cellular substrate carries a tough outer skin which provides a slidably smooth yet abrasion resistant surface. The outer skin may be of the same material as the substrate or may be formed of different material by laminating a plastic film to the substrate. This outer skin prevents excessive wear or tear of the material and permits the weather-stripping readily to be pulled into a long channel.

The weather-stripping of the present invention desirably is manufactured from sheets of foamed plastic already formed by known processes with a suitable tough outer skin, i.e. an "integral skin," of the same basic plastic. One presently preferred method of manufacture of the weather-stripping involves forming parallel grooves in such a thermoplastic sheet, initially of uniform thickness, by passing the sheet beneath a set of heated rollers, and thereafter (or concurrently) separating the individual strips so formed. The separated strips are utilized as weather-stripping or sealing strips by inserting them into retaining channels located on the sliding edges of closures such as windows. Preferably, the weather-stripping is made of foamed plastic which is sufficiently flexible to be supplied in roll form; such flexibility also minimizes mechanical problems of pulling the strip into a retaining channel in the closure.

Other objects, aspects and advantages of the invention will in part be pointed out in, and in part apparent from, the following description considered together with the accompanying drawings, wherein.

Figure 1:
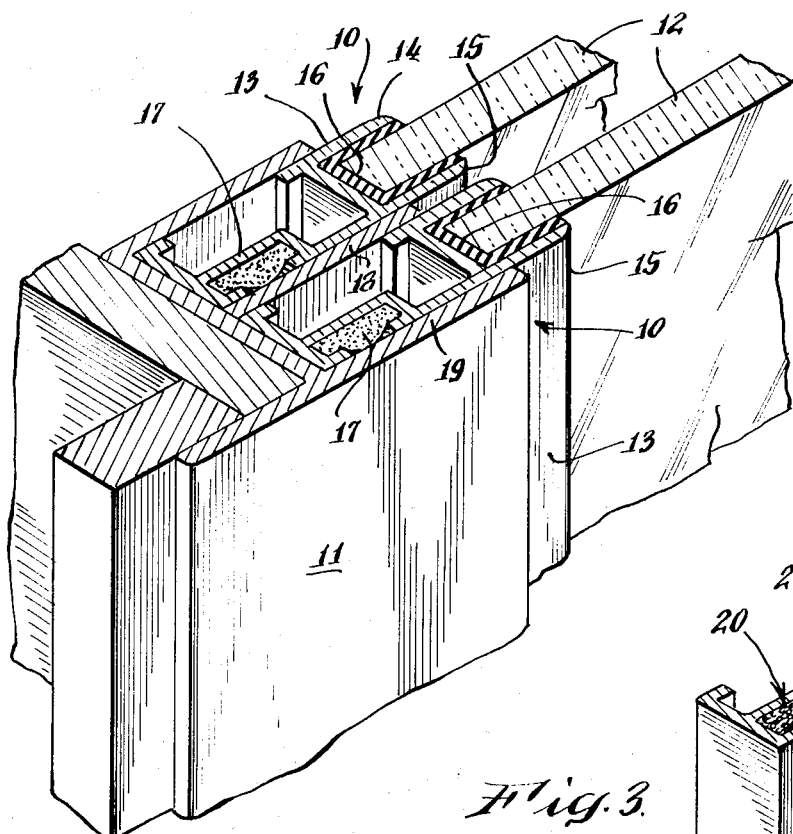
FIG. 1 is a perspective view of a storm sash in which the weather-stripping of the present invention is utilized.

Referring now to FIG. 1, a pair of storm sashes 10 are located adjacent to one another in supporting frame 11. Each storm sash carries a transparent pane 12 surrounded by an aluminum sash member 13. The pane 12 is held in place by a pair of outwardly extending lips 14 and 15 forming part of member 13. The panes can be insulated from the frame by suitable insulating material 16. An elongate channel 17 (see also FIG. 2) is located within each sash and arranged with an opening slot facing adjacent members 18 and 19, respectively, of supporting frame 11. Within the channel 17 is a weather-strip member or sealing element 20 now to be described.

Figure 3:
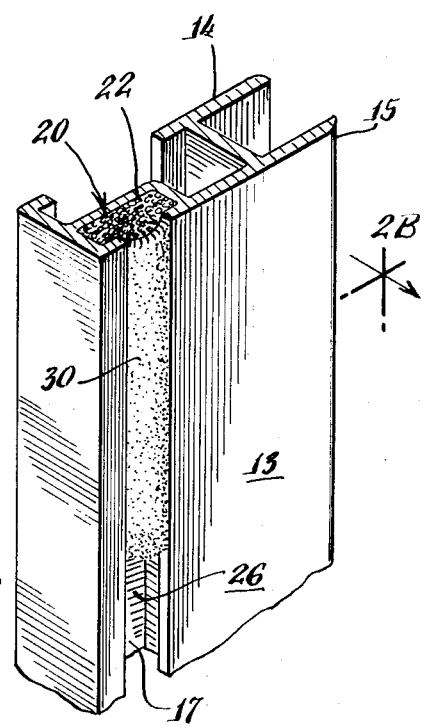
FIG. 3 is an enlarged sectional view of the channel member and weather-stripping of the present invention taken along the line 3—3 of FIG. 2.
Figure 2A:
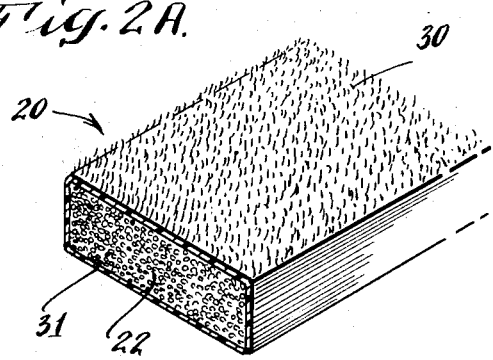
FIG. 2A is a perspective view showing the foam (cellular) weather-stripping with an abrasion resistant outer skin.
Figure 2B:
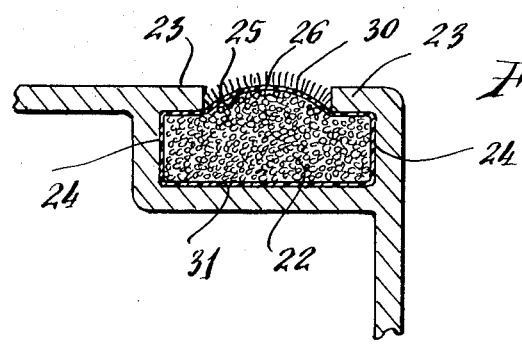
FIG. 2B is a perspective view showing the channel member with the weather-stripping in place.

FIGS. 2A, 2B and 3 illustrate the inventive concept, showing in detail the weather-strip sealing element 20 and its relation to aluminum sash member 13. Sealing element 20 basically comprises a resilient and compressible substrate 22 of cellular material, i.e. having a large number of very small air pockets. Advantageously, this substrate is formed of a foamed plastic, preferably an ionomer thermoplastic such as that known as Surlyn, made by DuPont. Foamed sheets of this material also may be obtained from Gilman Bros. Co., of Gilman, Connecticut under the trademark "Softlite." The term "ionomer" is generic for that class of polymers in which ionized carboxyl groups create ionic cross links in the intermolecular structure. These polymers are processed at conventional temperatures like other thermoplastic resins.

The side edges 24 of this substrate 22 are compressed moderately by pressure engagement with the lips 23. The central portion 25 of the substrate may bulge out a small distance through the slot 26, towards the window frame member. This bulging portion presents a generally arcuate shape which extends above the surface of the retaining lips 23.

In this embodiment, the sealing portion of the sealing element 20 comprises flocked fibers 30 secured to the outer surfaces of the central portion 25 to effect a tight and intimate contact with the adjacent window frame, and prevent air or water infiltration. For some applications, sufficient sealing may be achieved by the substrate alone without any fibers attached thereto, although typically the fibers are quite useful in providing the desired high degree of sealing, and also assuring a low sliding friction. If the flocked fibers are relatively long, the substrate may not need to extend above the surface of the lips 23.

Referring particularly to FIG. 2A, the material 22 used for the weather-strip sealing element 20 consists of a cellular core having a tough outer skin 31. In the embodiment shown, the fiber flocking 30 is secured directly to the skin. This outer skin is physically stronger than the foamed material and serves to structurally reinforce the cellular core, which by itself may be quite weak. This reinforcement augments the pull strength substantially, and especially aids in enabling lengths of weather-stripping to be drawn into a retaining channel, e.g. several feet in length.

Further, the outer skin 31 serves to resist the deleterious effects of abrasion, encountered both when the weather-stripping is inserted into its retaining channel, which generally has sharp edges, and also when the sliding members move with respect to one another. Such outer skin also preferably is watertight, to prevent moisture absorption by the "open cell" types of flexible foam plastics, when used as the substrate. By use of special skin materials, moreover, the skin can be arranged to protect the substrate material from the harmful effects of ultra-violet radiation from exposure to the sun.

An ionomer thermoplastic when formed into a foamed sheet may already possess a tough outer skin, e.g. where the foam processing melts the outer surfaces into a relatively continuous cover film which is not pocked, as is the cellular core material itself. Such a skin of melted ionomer plastic is abrasion-resistant so that it can be pulled into the retaining channel 17 without shredding, and has a sufficiently low coefficient of friction so that it will not drag or bind when inserted into the channel. The skin 31 in the FIG. 2A embodiment completely encases the cellular core; however, as will be apparent from the subsequent description, for some applications it may not be necessary to fully surround the core.

Some plastics, when directly foamed into sheet, form a very weak outer skin not usually sufficiently tough for the purposes outlined above. In such cases, or where the material to be processed has no skin, an outer skin with the desired properties may be added directly to the substrate foam. This may be accomplished by laminating a plastic sheet or film to the foam substrate, or by coating the substrate with a liquid plastic which when cured will provide a suitable outer skin. Thereafter, the laminated sheet can be manufactured into weather-stripping (as is discussed later).

The addition of the outer skin may be accomplished in conjunction with the flocking operation, e.g. by laminating a flocked backing of plastic film to the substrate, or by using for the flocking a plastic adhesive, such as one of the acrylic adhesives, which when cured will both provide the desired tough outer skin and fasten the flocking to the substrate. The laminated combination provides a weather-stripping which is resiliently compressible yet has a tough abrasion resistant outer skin with a low coefficient of friction. The outer skin may be laminated to either one or both sides (i.e. top and bottom) of the substrate and may be fused together at its edges so as to encase the foam plastic to make it impervious to the elements. Different materials may be utilized for the skin at the top and the bottom of the substrate to provide different physical properties optimally suited to the respective environmental requirements.

For the application shown, no special forming or machining of the weather-strip member 20 is needed, the cellular nature of the substrate permitting rectangular cross-sections to be employed in many applications. This has an economic advantage in that the material can be longitudinally cut from a sheet without any other machining or cutting operations being necessary. As the foamed plastic in such form is compressible and has a low coefficient of friction, a weather-strip with a thickness greater than the depth of the retaining channel can be utilized, and desirably fills the entire channel. The disclosed arrangement of FIG. 2B is especially advantageous because the relative height of the non-compressed portion of substrate raises the effective height of the flocked fibers to a level not previously attainable with substrate materials of modest cost, thereby significantly improving resistance to infiltration of air and water.

While the ionomer resin forms, such as Surlyn, are presently preferred for this invention, other related materials may provide good results in certain applications. For example, other foamed thermoplastics, and even thermosetting, materials can be utilized.

Figure 4:
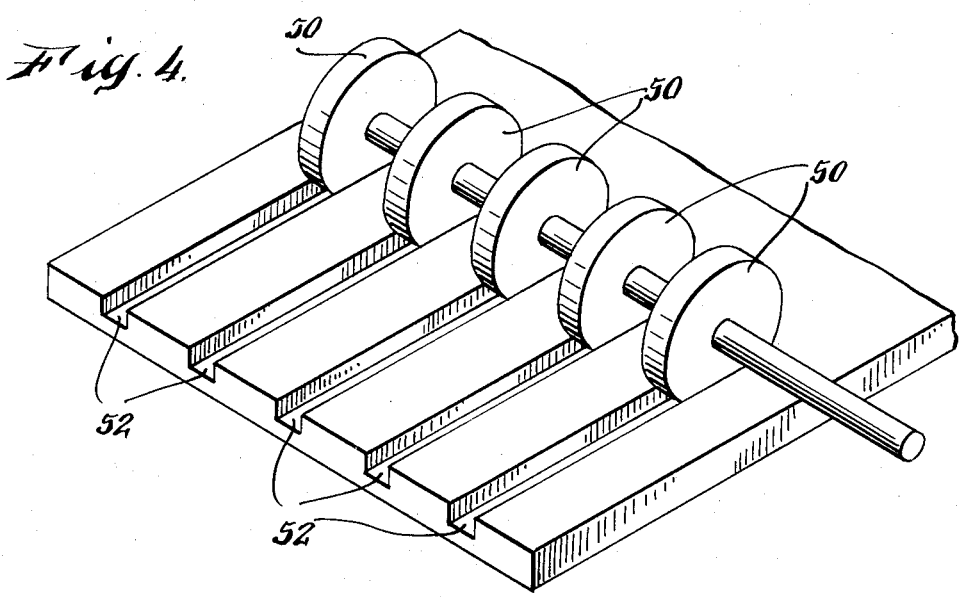
FIG. 4 is a perspective view illustrating one process of making weather-stripping.

It may be advantageous to form the weather-strip substrate with a central sealing segment of substantially greater height than the marginal side portions to be held in place by the confining lips 23. Such a weather-strip substrate may readily be manufactured from sheets of thermoplastic material having a cellular inner core. One process of manufacturing comprises the forming of parallel grooves in the thermoplastic sheet by passing the sheet under a series of heated rollers 50, as illustrated in FIG. 4. The heat will cause the plastic material to melt beneath the rollers, thereby reforming the plastic in the locus of the roller to a relatively low height. The reformed material provides an indentation or groove in the sheet so as to form several parallel strips which can thereafter be sliced apart at the center of the grooves 52 so as to form weather-strip members.

Figure 5A:
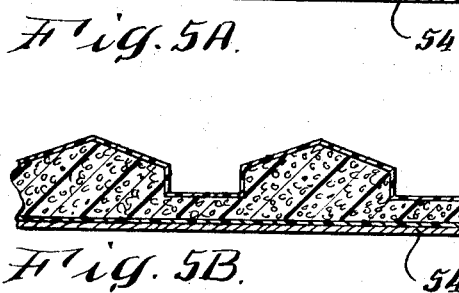
FIG. 5A shows in cross-section a sheet processed in accordance with FIG. 4.
Figure 5B:
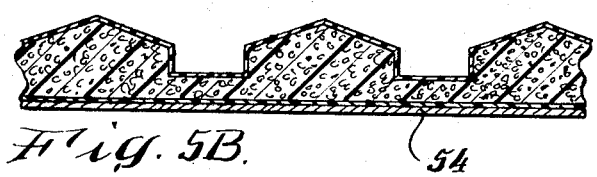
FIGS. 5B and 5C are sectional views disclosing other configurations into which the weather-stripping may be formed.
Figure 5C:
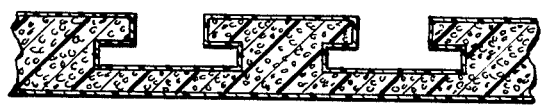
Figure 6A:
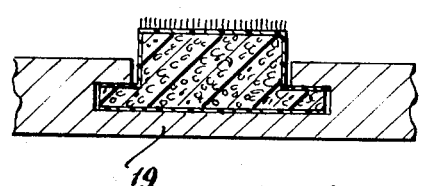
FIGS. 6A, 6B and 6C show different sealing configurations for the different cross-sections of FIGS. 5A, 5B and 5C.
Figure 6B:
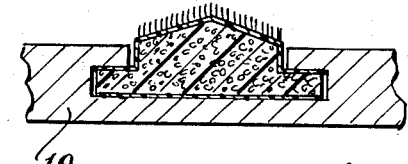
Figure 6C:
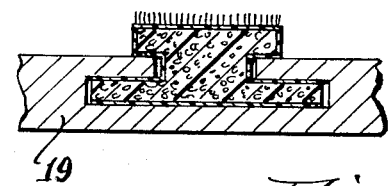

FIG. 5A is a sectional view of the plastic sheet in FIG. 4 showing grooves that have been formed as a result of the heated rollers passing over the surface of the cellular sheet. The material also can be formed into other advantageous shapes, e.g. as illustrated in FIGS. 5B and 5C. Such shapes can be produced in various ways, as by extruding ionomer foam plastic material directly through special dies, or by pulling an initially flat sheet of skin-protected plastic foam through heated forming dies to shape it as desired. FIGS. 6A, 6B and 6C show the various types of weather-strips in corresponding channels. An additional backing layer 54 may be applied to the weather-strips as a stiffener, although for many applications the tough outer skin 31 will be sufficient.

Conventional flocking techniques can be used to apply to the foamed plastic substrate any of a wide range of different fibers, e.g. nylon, rayon, etc. The flocking can be effected so as to cover an entire flat sheet of the foamed plastic, after which the sheet can be cut into strips (of rectangular cross-section), or the flocked sheet can be processed by the heated roller arrangement of FIG. 4 (or equivalent) so as to form corresponding grooves prior to separation. The flocked fibers may be suppressed in the heated regions, using that heated-roller technique, depending of course upon the material of the fibers being used. As one alternative, the fibers may be flocked onto the sheet in predetermined sections, as by applying an adhesive coating to the sheet in parallel bands prior to flocking. Thereafter, the sheet can be slit parallel to the non-flocked areas between the bands, with or without prior processing with heated rollers as in FIG. 4. In some circumstances, the flocking may be carried out after the foamed plastic has been formed with grooves as shown in FIGS. 5A, 5B and 5C.

Figure 5D:
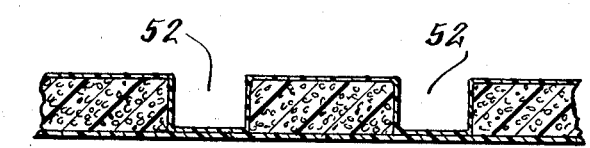
FIG. 5D shows a variation on FIG. 5A.

It may particularly be noted that when forming grooves in an ionomer with heated rolls, where the sheet already has the tough outer skin, the skin will follow the surfaces of the grooves, the heat of the rolls serving primarily to melt the ionomer foam interior to produce the desired shape. Thus when the sheet is slit into strips, the top and bottom surfaces will present the desired tough outer skin. The edge surfaces however will be skinless. As shown in FIG. 5D, the forming operation can be carried out in such a manner that the top and bottom skins may actually fuse together, so that when the strips are cut apart the cellular foam interior of each strip will be completely encased by the tough outer skin.

Figure 7:
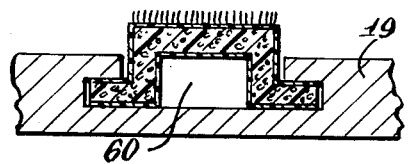
FIG. 7 shows a modified weather-strip arrangement in cross-section.

FIG. 7 shows that the foamed plastic material may for some applications be formed with an internal groove-like passage 60, adapted to make the mass of material somewhat more compressible and resilient than with a solid mass of plastic. Such configuration can for example be made by extruding the foamed plastic directly through a special die of appropriate shape.

Although several preferred embodiments of the invention have been disclosed herein, it is desired to emphasize that this is for the purpose of illustrating the invention and should not be considered to be necessarily limitative of the invention, since various other modifications of the invention will be apparent to those skilled in this art for solving specific problems of weather-stripping.

I claim:

1. In a closure comprising relatively slidable members having a region of overlap to be sealed against infiltration of water and air by weatherstripping, one of said members being formed in said region with a groove which is generally T-shaped in cross-section so as to present a pair of parallel opposed lips in the outer surface of said one member adjacent the other member, said lips extending parallel to the bottom surface of said groove, the confined spaces between said bottom surface and the inner surfaces of said lips opposite said bottom surface serving to define an effective depth dimension of said groove, the separation between said lips establishing a groove mouth the width of which is substantially less than the width of said groove;

said weatherstripping comprising a sealing element including an elongate substrate in said groove formed with a core of foamed material providing flexibility and resilient compressibility;

said substrate at least substantially filling the confined spaces between said bottom surface and said inner surfaces of said lips; the portions of said substrate in said confined spaces having a thickness, when free prior to being pulled into said groove, sufficient to provide said substantial filling of said confined spaces to maintain a tight seal and resist the infiltration of water and air thereby;

a tough outer skin on said substrate core, where it engages said bottom and inner surfaces of said groove, to provide structural integrity therefor and to prevent damage to said substrate when it is initially installed by pulling the substrate longitudinally into the groove;

the central uncompressed portion of said foamed substrate, between said confined spaces, protruding up into said groove mouth to a position above the level of said inner lip surfaces holding the adjacent compresses portions of said substrate tightly in place; and a mass of flexible, resilient fibers attached to and projecting outwardly away from the exposed upper surface of said central, uncompressed portion of said foamed substrate where it protrudes from said groove into the region of said mouth, said fibers engaging the adjacent surface of said other member to effect a desirably tight, water-and-air-resistant joint between said two members while permitting said relative sliding movement.

2. The improved sealing element of claim 1 wherein the substrate is a foamed plastic.

3. The improved sealing element of claim 2 wherein the foamed substrate in its non-compressed state is of a greater thickness than the depth of the groove mouth such that the uncompressed portions of the sealing element will extend above the level of said retaining channel while being securely held in place by the internal compressive force.

4. The improved sealing element of claim 1 wherein the foamed substrate is entirely encased by said outer skin.

5. The improved sealing element of claim 1 wherein the resiliently compressible foam substrate is an ionomer thermoplastic.

6. The improved sealing element of claim 1 wherein flocked fibers are attached to the exposed portion of the sealing element.

* * * * *

UNITED STATES PATENT OFFICE
CERTIFICATE OF CORRECTION

Patent No. 3,758,992          Dated September 18, 1973

Inventor(s)    HAROLD G. OLSON

It is certified that error appears in the above-identified patent and that said Letters Patent are hereby corrected as shown below:

Column 2, lines 50-55    reads "FIG. 2B is a perspective view showing the channel member with the weather-stripping in place;

FIG. 3 is an enlarged sectional view of the channel member and weather-stripping of the present invention taken along the lines 3-3 of FIG.2;"

Should read --FIG. 2B is an enlarged sectional view of the channel member and weather-stripping of the present invention taken along the line 2B-2B of FIG. 3;

FIG. 3 is a perspective view showing the channel member with the weather-stripping in place;--

Column 4, line 67    reads    "forms" should read --foams--

Signed and sealed this 25th day of December 1973.

(SEAL)
Attest:

EDWARD M. FLETCHER, JR.                    RENE D. TEGTMEYER
Attesting Officer                          Acting Commissioner of Patents